(12) United States Patent
Ashiura et al.

(10) Patent No.: US 7,812,096 B2
(45) Date of Patent: Oct. 12, 2010

(54) MODIFICATION METHOD OF POLYMER

(75) Inventors: Makoto Ashiura, Hiratsuka (JP); Tetsuji Kawazura, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 430 days.

(21) Appl. No.: 11/332,394

(22) Filed: Jan. 17, 2006

(65) Prior Publication Data

US 2006/0160956 A1    Jul. 20, 2006

(30) Foreign Application Priority Data

Jan. 18, 2005    (JP) ............................. 2005-010400

(51) Int. Cl.
*C08F 297/02*   (2006.01)
*C08F 2/00*     (2006.01)
*C08F 4/00*     (2006.01)
*C08F 118/02*   (2006.01)
*C08F 20/06*    (2006.01)

(52) U.S. Cl. .................... 525/242; 526/317.1; 526/319; 526/236; 526/194

(58) Field of Classification Search ................ 525/242; 526/317.1, 319, 236, 194
See application file for complete search history.

(56) References Cited

U.S. PATENT DOCUMENTS

| 4,581,429 | A  | 4/1986 | Solomon et al. |
| 5,945,492 | A  | 8/1999 | Robert |
| 6,271,340 | B1 | 8/2001 | Anderson et al. |
| 6,353,107 | B1 | 3/2002 | Kramer et al. |
| 6,569,940 | B1 | 5/2003 | Wunderlich et al. |

FOREIGN PATENT DOCUMENTS

| JP | 9-87309 A     | 3/1997 |
| JP | 10-130308 A   | 5/1998 |
| JP | 11-322714 A   | 11/1999 |
| JP | 2001-508485 A | 6/2001 |
| JP | 2002-155111 A | 5/2002 |
| JP | 2002-518559 A | 6/2002 |
| JP | 2004-108986   | 4/2004 |
| JP | 2004-182926   | 7/2004 |

*Primary Examiner*—William K Cheung
(74) *Attorney, Agent, or Firm*—Connolly Bove Lodge & Hutz LLP

(57) ABSTRACT

A method for modifying a polymer by mixing and reacting a polymer (A), a compound (B) having a nitroxide radical in the molecule thereof, a radical initiator (C), and a radical polymerizable monomer (D) in a non-solvent system in a mixed to thereby graft a monomer (D) to the polymer (A), whereby a desired functional group is introduced to the polymer, without a causing decrease in the molecular weight, gelation, or formation of a homopolymer.

8 Claims, No Drawings

MODIFICATION METHOD OF POLYMER

BACKGROUND OF THE INVENTION

1. Field of the Invention

The present invention relates to a method for modifying a polymer, more specifically relates to a method for reacting a polymer, a compound having a nitroxide radical in the molecule thereof, a radical initiator, and a radical polymerizable monomer in a non-solvent system so as to graft the radical polymerizable monomer to the polymer.

2. Description of the Related Art

Butyl rubber, ethylene-propylene polymer (EPM), and other thermoplastic polymers, or diene-based rubber or polypropylene, polyethylene, and other thermoplastic resins are low in polarity, and therefore, there are the problems that the compatibility with a polyamide, polyester, or other resins is low and the bondability thereof to glass etc. is inferior.

For example, Japanese Patent Publication (A) No. 2004-182926 and Japanese Patent Publication (A) No. 2004-108986 have proposed to introduce a functional group into a polymer with TEMPO (i.e., 2,2,6,6-tetramethyl-1-piperidinyloxy radicals) or the derivatives thereof and a radical initiator. However, polymers desirably have various functional groups, depending on their applications, and therefore there are problems that it is necessary to synthesize various types of TEMPO derivatives in advance and the cost becomes high. Further, U.S. Pat. No. 4,581,429 discloses a method for reacting a nitroxide radical compound with a polymer in a solvent system, followed by adding a monomer and performing a graft reaction. In the first stage reaction where the nitroxide radical compound is reacted with and grafted to the polymer, it is necessary to use a high hydrogen abstraction radical initiator. In the case of a solvent system, there are limitations to the reaction at a high temperature, and therefore a radical initiator having a high hydrogen abstraction even under moderate conditions has to be used, but such a radical initiator is a very dangerous compound and difficult to handle. Further, since the hydrogen abstraction from a solvent lowers the reaction efficiency, in U.S. Pat. No. 4,581,429, a solvent replacing all of the hydrogen with chlorine is used, but such a solvent causes a high load on the environment. Further, a reaction efficiency of a solvent system is lower than a non-solvent system. Therefore, since the introduction rate of the TEMPO moiety in the first stage reaction is low, there is a problem that the introduction rate of the functional group in the second stage graft reaction starting from that moiety also becomes low.

DISCLOSURE OF THE INVENTION

Accordingly, an object of the present invention is to develop a method for modifying a polymer by simply introducing various functional groups, without causing a decrease in the molecular weight or without causing gelation during the modification or without causing the formation of a homopolymer in the system, as a method for enhancing the polarity of a polymer, enabling a reaction at the interface, or imparting another function.

In accordance with the present invention, there is provided a method for modifying a polymer comprising:

mixing and reacting a polymer (A), a compound (B) having a nitroxide radical in the molecule thereof, a radical initiator (C), and a radical polymerizable monomer (D) in a non-solvent system in a mixer to thereby graft the monomer (D) to the polymer (A).

According to the present invention, by mixing and reacting a polymer (A), a compound (B) having a nitroxide radical such as TEMPO derivative in the molecule thereof, a radical initiator (C), and a radical polymerizable monomer (D) in a non-solvent system, it is possible to graft the monomer (D) to the polymer (A) to thereby modify the polymer (A). Therefore, by suitably selecting the monomer (D), it is possible to simply obtain a grafted polymer having a desired functional group in the polymer chain.

BEST MODE FOR CARRYING OUT THE INVENTION

In this specification and in the claims which follow, the singular forms "a", "an" and "the" include plural referents unless the context clearly dictates otherwise.

The inventors found that, by mixing and reacting a polymer (A), a compound (B) having a nitroxide radical in the molecule thereof such as a TEMPO derivative, a radical initiator (C), and a radical polymerizable monomer (D) in a non-solvent system, while heating, a polymer (A) having a monomer (D) grafted thereto is obtained and various functional groups can be easily introduced. This can be schematically shown as follows.

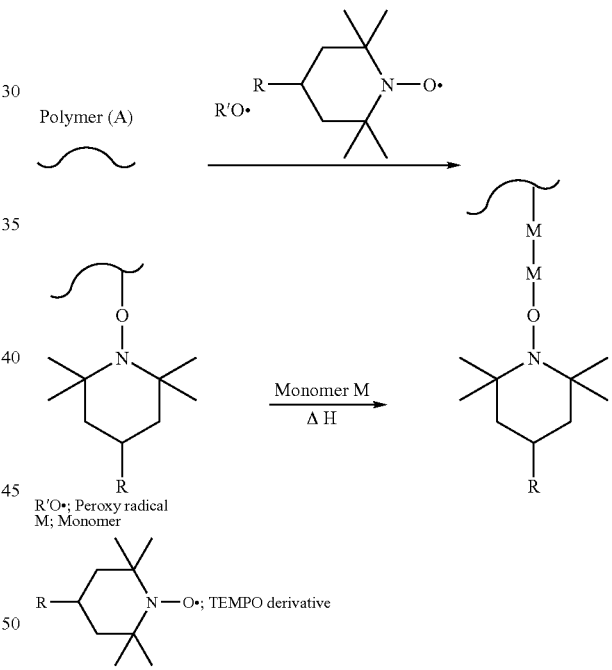

As the polymer (A) capable of being modified according to the present invention, for example, polyisobutylene, polybutene, butyl rubber, isobutylene-p-methylstyrene polymer, halogenated butyl rubber, brominated isobutylene-p-methylstyrene polymer, styrene-isoprene-butadiene polymer, chloroprene rubber, ethylene-propylene-diene three-way polymer rubber, ethylene-propylene polymer, ethylene-propylene-butene three-way polymer, styrene-butadiene-styrene block polymer, styrene-isoprene-styrene polymer, styrene-ethylene-butene-styrene block polymer, styrene-ethylene-propylene-styrene polymer, polyethylene, polypropylene, polystyrene, polyaromatic vinyl, polyolefin, polyisoprene, various types of styrene-butadiene polymers, various types of polybutadienes, acrylonitrile-butadiene polymer, hydrogenated acrylonitrile-butadiene polymer, acryl rubber, silicone rubber, fluororubber, epichlorohydrin rubber, various types of polymethacrylic acid esters, various types of polyethers, various types of polysulfides, various types of polyvinyl ethers, various types of polyesters, various types of polyamides, cellusolve, starch, various types of polyurethanes, various types of polyureas, various types of polyamines, etc. may be mentioned.

As the compound (B) including a nitroxide radical (—N—O.) usable in the present invention, the following compounds may be mentioned. Note that the addition amounts of these compounds is preferably 0.01 to 40 parts by weight, more preferably 0.05 to 30 parts by weight, based upon 100 parts by weight of the polymer (A).

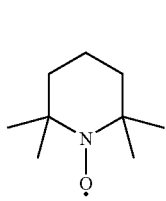
2,2,6,6-tetramethyl-1-piperidinyloxy (TEMPO)

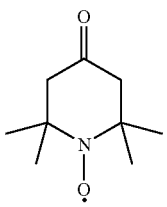
4-oxy TEMPO (1)
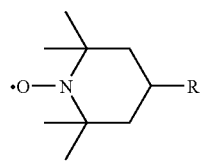

(2)
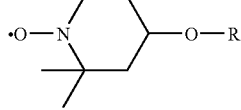

(3)
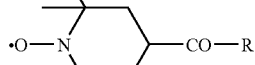

(4)
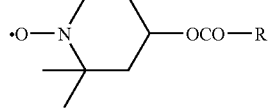

(5)
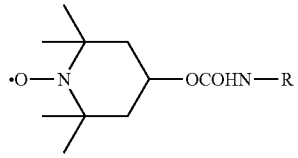

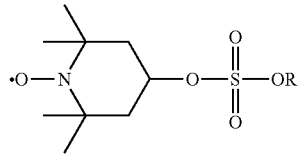
(6)

where, in formulas (1) to (6), R indicates an organic group including a $C_1$ to $C_{30}$ alkyl group, allyl group, amino group, isocyanate group, hydroxyl group, thiol group, vinyl group, epoxy group, thiurane group, carboxyl group, carbonyl-group-containing group (e.g., succinic anhydride, maleic anhydride, glutaric anhydride, phthalic anhydride, and other cyclic acid anhydrides), amide group, ester group, imide group, nitrile group, thiocyan group, $C_1$ to $C_{20}$ alkoxy group, silyl group, alkoxysilyl group, nitro group, and other functional groups.

(1)
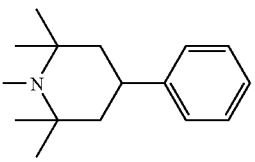 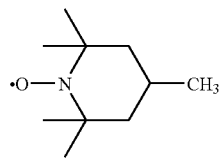
4-phenyl TEMPO      4-methyl TEMPO

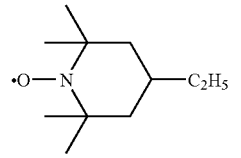 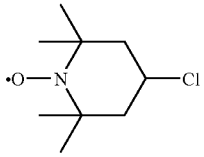
4-ethyl TEMPO      4-chloro TEMPO (2)
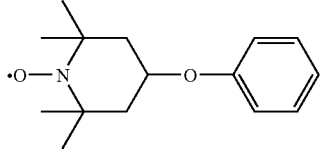
4-phenoxy TEMPO

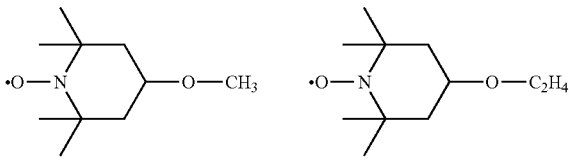
4-methoxy TEMPO      4-ethoxy TEMPO (3)
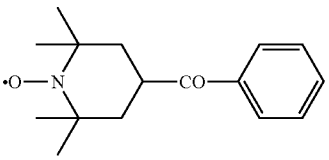
4-benzoyl TEMPO

-continued
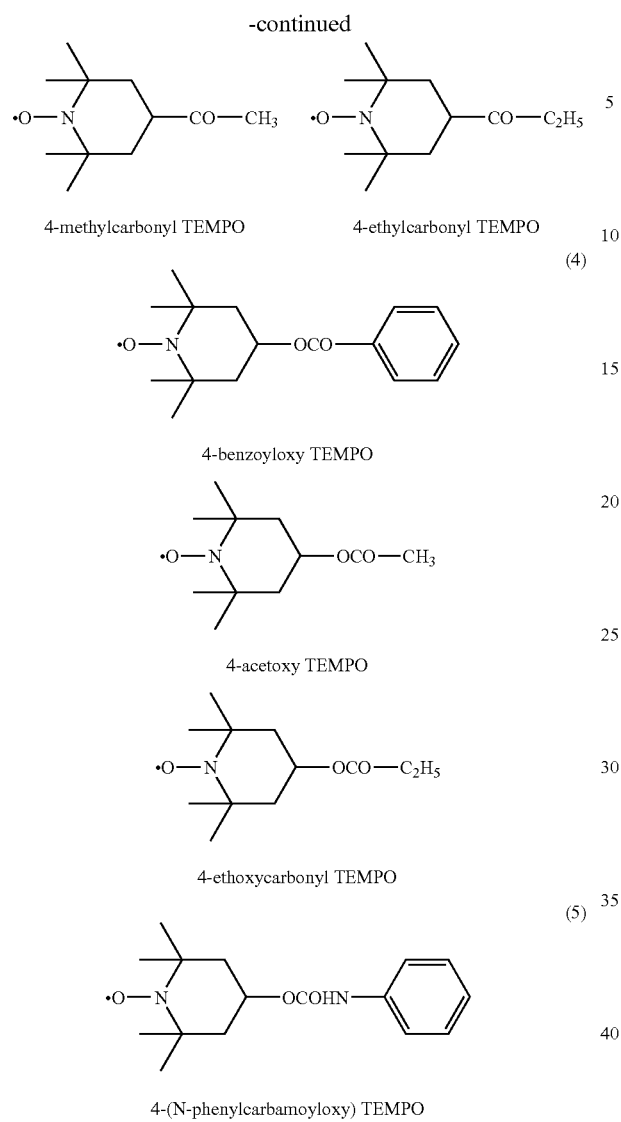
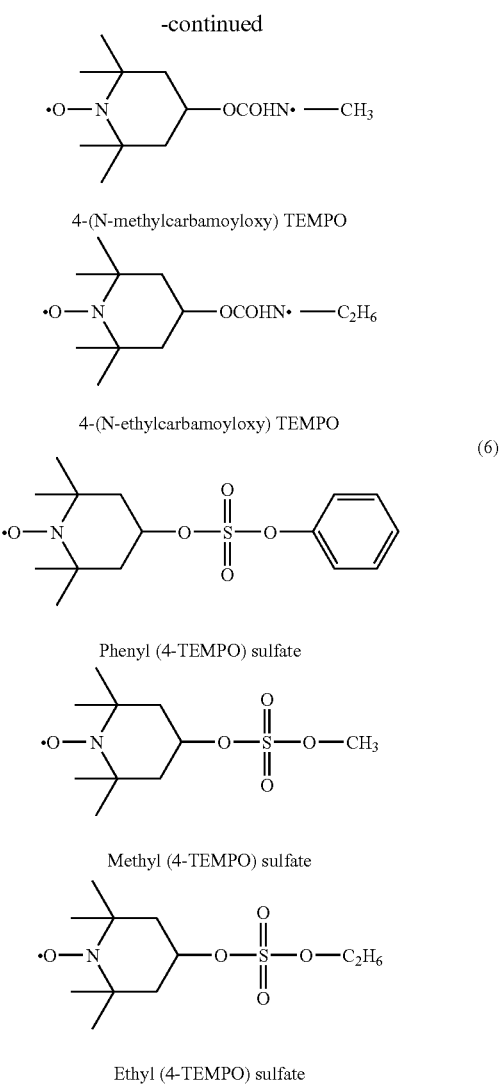
Other examples are given below.
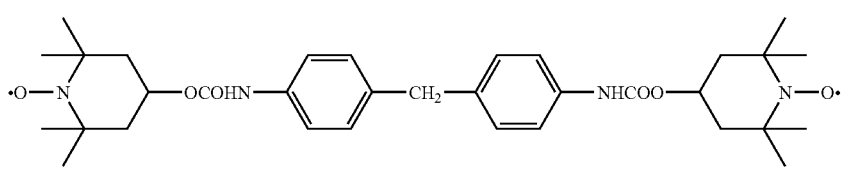
MDP-TEMPO
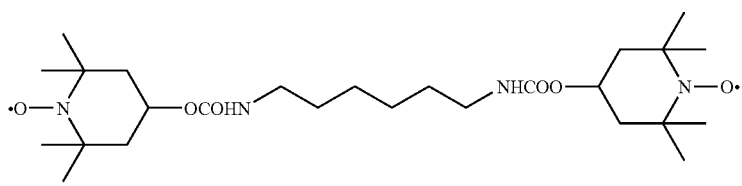

-continued
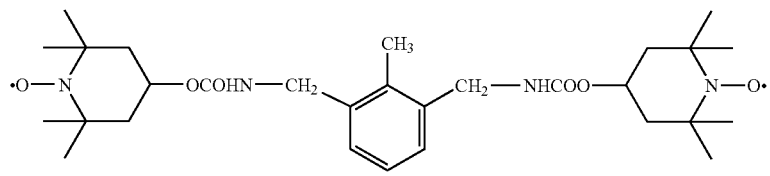
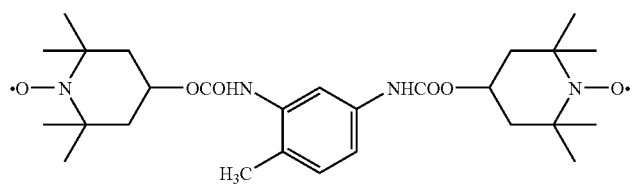
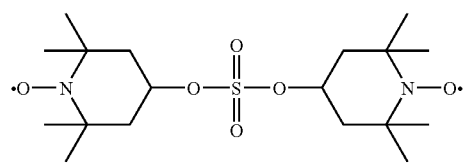
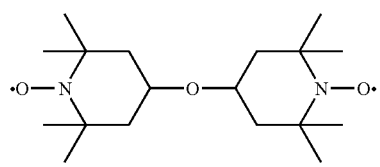
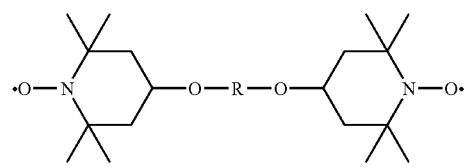
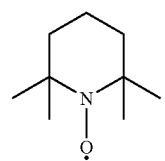
(wherein, R indicates a $C_1$ to $C_{30}$ alkyl group or phenyl group)
2,2,6,6-tetramethyl-piperidin-1-yloxy
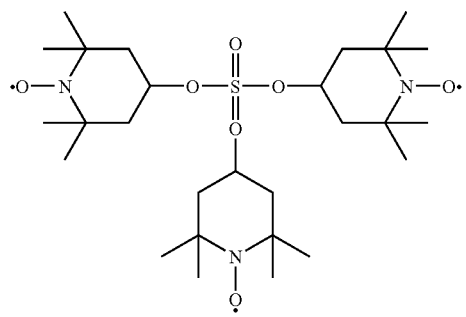
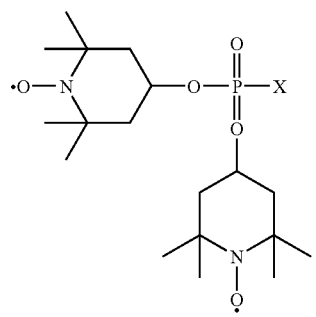
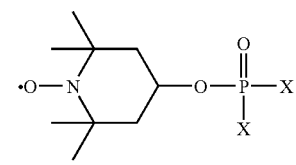
X; Br or Cl
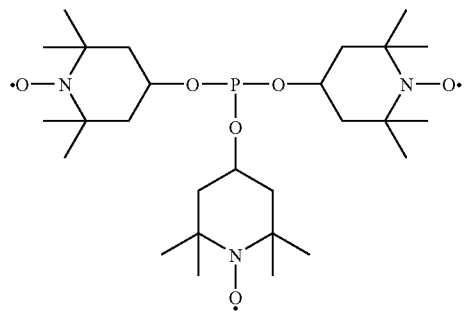
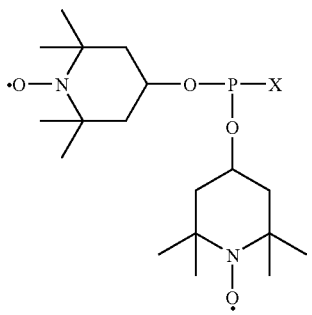
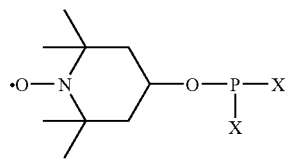
X; Br or Cl -continued
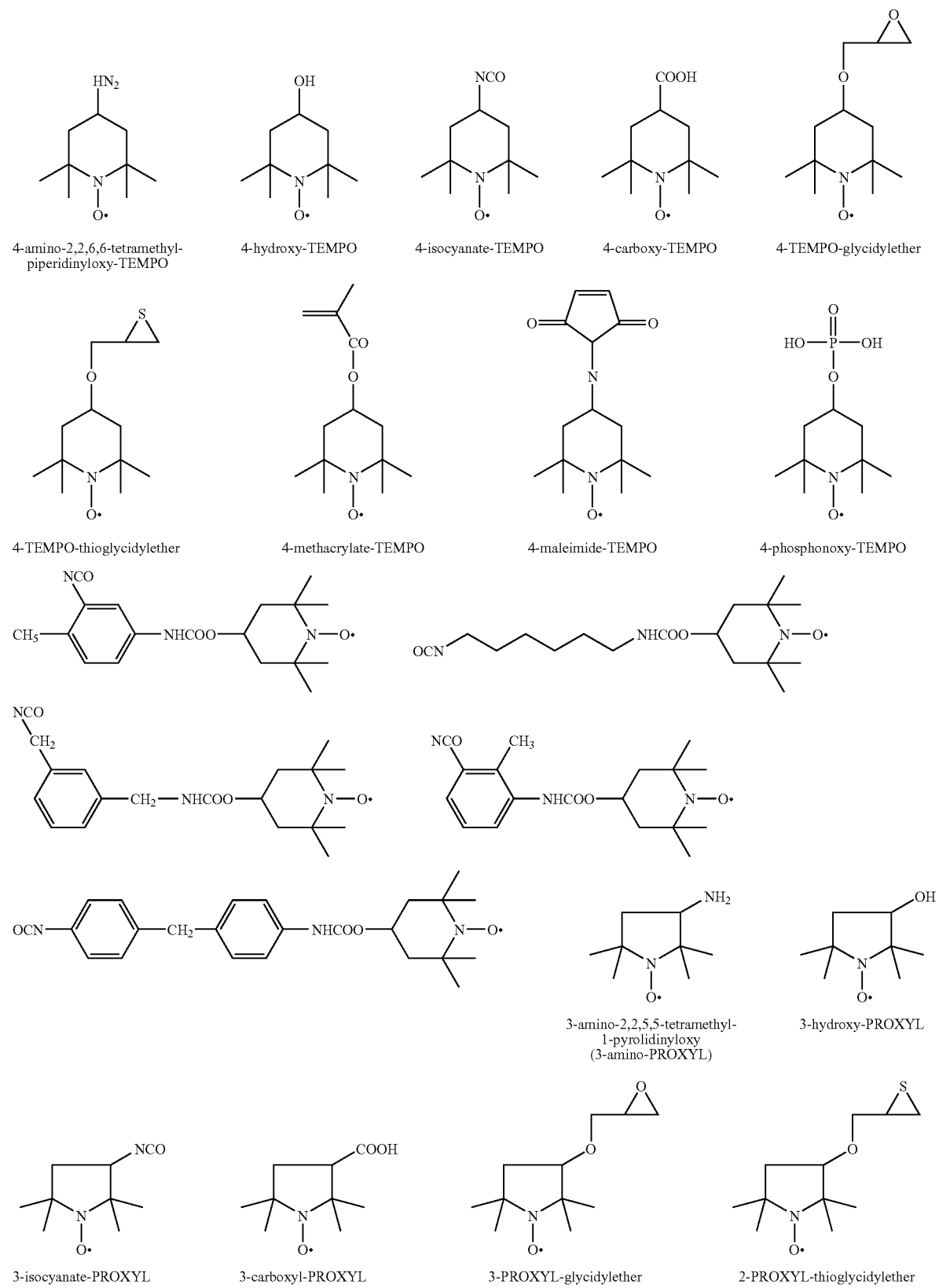

-continued

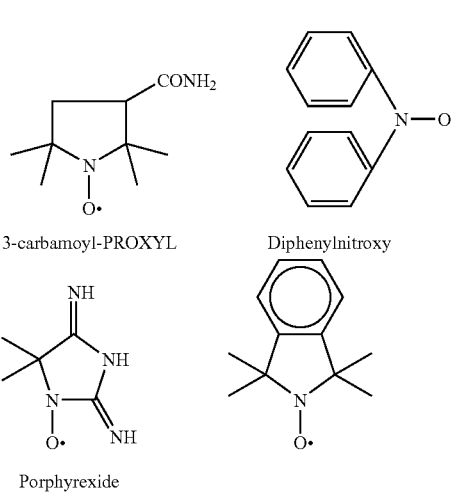
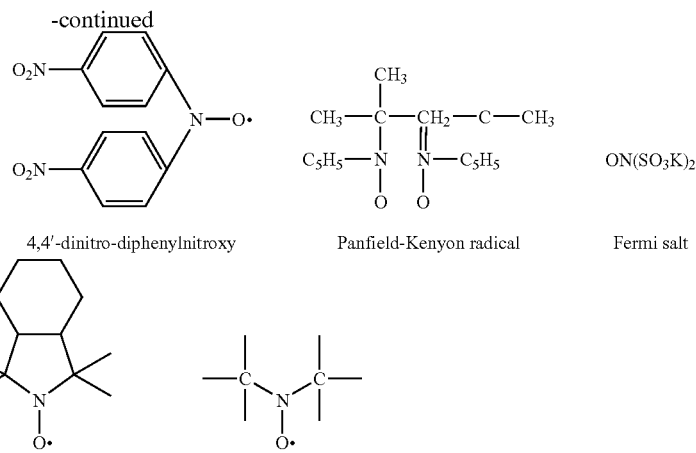

As the means for generating a carbon radical in the polymer, a radical initiator (C) is added to the reaction system. The radical initiator (C) usable in the present invention includes, for example, benzoyl peroxide (BPO), t-butyl peroxybenzoate (Z), dicumyl peroxide (DCP), t-butylcumyl peroxide (C), di-t-butyl peroxide (D), 2,5-dimethyl-2,5-di-t-butyl peroxyhexane (2,5B), 2,5-dimethyl-2,5-di-t-butylperoxy-3-hexyne (Hexyne-3), 2,4-dichloro-benzoyl peroxide (DC-BPO), di-t-butylperoxy-di-isopropylbenzene (P), 1,1-bis(t-butylperoxy)-3,3,5-trimethyl-cyclohexane (3M), n-butyl-4,4-bis(t-butylperoxy)valerate, 2,2-bis(t-butylperoxy)butane and other organic peroxides and azodicarbonamide (ADCA), azobis-isobutyronitrile (AIBN), 2,2'-azobis-(2-amidinopropane)di-hydrochloride, dimethyl 2,2'-azobis(isobutyrate), azobis-cyanovaleric acid (ACVA), 1,1'-azobis-(cyclohexane-1-carbonitrile) (ACHN), 2,2'-azobis-(2,4-dimethylvaleronitrile) (ADVN), azobis-methylbutyronitrile (AMBN), 2,2'-azobis-(4-methoxy-2,4-dimethylvaleronitrile), and other radical generators. These may be added to the reaction system (or the mixed system or the catalyst system) of the polymer and such a compound having a nitroxide radical so as to cause the generation of the carbon radical in the polymer. The addition amount of the radical initiator (C) is, based upon 100 parts by weight of the polymer (A), preferably 0.001 to 30 parts by weight, more preferably 0.002 to 25 parts by weight.

The radical polymerizable monomer (D) usable in the present invention include, for example, styrene, α-methylstyrene, p-methylstyrene, m-methoxystyrene, o-chlorostyrene, N,N-dimethyl-p-amino methylstyrene, p-acetoxystyrene, p-t-butoxystyrene, divinylbenzene, or other aromatic vinyl compounds; methyl(meth)acrylate (here, the expression "methyl (meth)acrylate" including both methyl methacrylate and methyl acrylate. This is the same hereinbelow even with different compounds), ethyl (meth)acrylate, n-butyl(meth)acrylate, t-butyl(meth)acrylate, 2-ethylhexyl (meth)acrylate, stearyl (meth)acrylate, or other alkyl (meth)acrylates; methyl crotonate, ethyl crotonate, methyl cinnamate, ethyl cinnamate, and other unsaturated monocarboxylic acid esters; trifluoroethyl (meth)acrylate, pentafluoropropyl (meth)acrylate, heptafluorobutyl (meth)acrylate, and other fluoroalkyl (meth)acrylates; trimethylsiloxanyldimethylsilylpropyl (meth)acrylate, tris(trimethylsiloxanyl)silylpropyl (meth) acrylate, di(meth)acroylpropyldimethylsilylether, and other siloxanyl (meth)acrylates; 3-(trimethoxysilyl)propyl(meth) acrylate, vinyltriethoxysilane, or other alkoxysilane compounds; alkyleneglycol such as ethyleneglycol, 1,2-propanediol, 1,3-propanediol, 1,6-hexanediol, etc.; mono- or di-(meth)acrylates; 2-methoxyethyl(meth)acrylate, 2-ethoxyethyl(meth)acrylate, 3-ethoxypropyl(meth)acrylate, or other alkoxyalkyl(meth)acrylates; cyanoethyl(meth) acrylate, cyanopropyl(meth)acrylate, or other cyanoalkyl (meth)acrylates and acrylonitrile, methacrylonitrile, and other cyano compounds; N,N-dimethylaminoethyl(meth) acrylate, N-t-butylaminoethyl(meth)acrylate, and other nitrogen-containing (meth)acrylates; (meth)acrylamide, N,N-dimethyl(meth)acrylamide, N-isopropyl(meth)acrylamide, and other (meth)acrylamides; 2-hydroxyethyl(meth) acrylate, 2-hydroxypropyl(meth)acrylate, and other hydroxyalkyl(meth)acrylates; 2-hydroxyethyl crotonate, 2-hydroxypropyl crotonate, 2-hydroxypropyl cinnamate, and other unsaturated carboxylic acid hydroxyalkylesters; (meth) allyl alcohols and other unsaturated alcohols; (meth)acrylic acid, crotonic acid, cinnamic acid, and other unsaturated (mono)carboxylic acids; (anhydrous) maleic acid, fumaric acid, (anhydrous) itaconic acid, citraconic acid, and other unsaturated polycarboxylic acids (anhydrides); and their mono and di-esters; 2-isocyanate ethyl(meth)acrylate and other isocyanate compounds; allylglycidyl ether, glycidyl (meth)acrylate, and other epoxy group-containing unsaturated compounds and thiram group-containing compounds with these converted to thiram; butadiene, isoprene, and other diene-based compounds etc. The amount of the monomer (D) added is not particularly limited, but it is preferable to react 0.01 to 100 parts by weight of the monomer (D) to 100 parts by weight of the polymer (A).

The ratios of the addition amounts of the compound (B) having a nitroxide radical in the molecule thereof and the radical polymerizable monomer (D) is preferably (D)/(B)= 0.005 to 100 (molar ratio). If this ratio is smaller than 0.005, the effect of the introduction of the functional groups is liable not to be manifested. Conversely, if this ratio is larger than 100, a homopolymer is liable to be generated, and therefore, this is not preferable. Further, it is sufficient to introduce about one molecule's worth of (D) to one location of the moiety of (B) introduced into the polymer. Further, from the perspective of cost as well, (D)/(B)=0.005 to 1 (molar ratio) is more preferable.

The method for mixing and reacting the components (A) to (D) according to the present invention is not particularly limited insofar as the mixture is in a non-solvent system, but first reacting (A) to (C), then reacting (D) is preferable, since more effective modification is possible. This process may be continuous or not continuous. This modification may be performed using, for example, an internal mixer (Banbury mixer, kneader, Brabender mixer), twin-screw extruder, single-screw extruder, roll, etc.

As the organic group introduced into the polymer by modification of the polymer according to the present invention, for example, a $C_1$ to $C_{30}$ alkyl group, phenyl group, amino group, isocyanate group, hydroxyl group, vinyl group, epoxy group, thiram group, carboxyl group, carbonyl-group containing group (for example, succinic anhydride, maleic anhydride, glutaric anhydride, phthalic anhydride, and other cyclic acid anhydrides), amide group, ester group, imide group, nitrile group, thiocyan group, $C_1$ to $C_{20}$ alkoxy group, silyl group, alkoxysilyl group, etc. may be mentioned.

The modified polymer according to the present invention may contain therein polymers such as a diene-based rubber, polyolefin-based rubber, thermoplastic TPE, a polyolefin, thermoplastic resin, thermosetting resin; reinforcing fillers such as carbon black, silica; vulcanization or cross-linking agent; vulcanization or cross-linking accelerator; various types of oils, antioxidant, plasticizer, or various types of other additives generally used. These components may be mixed and vulcanized by general methods to obtain a composition for use for vulcanization or cross-linking. The formulation amounts of these additives may be made the conventional general amounts insofar as the object of the object of the present invention is not contravened.

EXAMPLES

Examples will now be used to further explain the present invention, but the scope of the present invention is by no means limited to these Examples.

Examples 1 to 2 and Comparative Examples 1 to 2

In the Examples and Comparative Examples, the following starting materials were used:

IIR: butyl rubber (made by Bayer, BUTYL301)

Di-t-butylperoxide: (made by NOF Corporation, Perbutyl D)

OH-TEMPO: 4-hydroxy-2,2,6,6-tetramethylpiperidinyl-1-oxyl (made by Asahi Denka, LA7RD)

GMA: Glycidylmethacrylate (made by Kanto Chemical)

Styrene: (made by Kanto Chemical)

Reaction Between TEMPO Derivative and IIR (Production of OHT-IIR) (Synthesis Example)

IIR in an amount of 350.0 g, di-t-butylperoxide in an amount of 30.4 g, and OH-TEMPO in an amount of 32.2 g were charged into an internal Banbury mixer set at a temperature of 60° C. and mixed for 10 minutes. The mixture thus obtained was mixed in an internal Banbury mixer set at a temperature of 100° C., while substituting with nitrogen for 5 minutes. While mixing, the temperature was raised to 175° C. and the mixture was mixed for 30 minutes. Part of the polymer obtained was dissolved in toluene and reprecipitated to isolate and purify a polymer. By using purified products for analysis by $^1$H-NMR, the introduction of a TEMPO moiety (alkoxyamino group) was confirmed. The introduction rate was 0.30 mol %.

Example 1

Production of Modified IIR (1)

OHT-IIR in an amount of 350.0 g and glycidyl methacrylate in an amount of 26.5 g were mixed in an internal Banbury mixer set at a temperature of 100° C., while substituting with nitrogen for 5 minutes. While mixing, the temperature was raised to 185° C. and the mixture mixed for 15 minutes. Part of the polymer obtained was dissolved in toluene and reprecipitated to isolate and purify a polymer. Purified products were used for analysis by IR and analysis by $^1$H-NMR. The introduction rate of the glycidyl methacrylate-derived epoxy group (mol %) was found by the integrated ratio of the $^1$H-NMR signal. The results are shown in Table I.

Example 2

Production of Modified IIR (2)

OHT-IIR in an amount of 350.0 g and styrene in an amount of 19.4 g were mixed in an internal Banbury mixer set at a temperature of 100° C., while substituting with nitrogen for 5 minutes. While mixing, the temperature was raised to 185° C. and the mixture was mixed for 15 minutes. Part of the polymer obtained was dissolved in toluene and reprecipitated to isolate and purify a polymer. Purified products were used for analysis by $^1$H-NMR. The introduction rate of the styrene-derived phenyl group (mol %) was found by the integrated ratio of the $^1$H-NMR signal. The results are shown in Table I.

Comparative Example 1

IIR in an amount of 350.0 g and glycidyl methacrylate in an amount of 26.5 g were mixed in an internal Banbury mixer set at a temperature of 100° C., while substituting with nitrogen for 5 minutes. While mixing, the temperature was raised to 185° C. and the mixture was mixed for 15 minutes. Part of the polymer obtained was dissolved in toluene and reprecipated to isolate and purify a polymer. Purified products were used for analysis by IR and analysis by $^1$H-NMR. The results are shown in Table I.

Comparative Example 2

IIR in an amount of 350.0 g and styrene in an amount of 19.4 g were mixed in an internal Banbury mixer set to a temperature of 100° C. while substituting with nitrogen for 5 minutes. While kneading, the temperature was raised to 185° C. and the mixture kneaded for 15 minutes. Part of the obtained polymer was dissolved in toluene and reprecipitated to isolate and refine a polymer. Refined products were used for analysis by IR and analysis by $^1$H-NMR. The results are shown in Table I.

Comparative Example 3

In a flask having a volume of 20 ml, IIR in an amount of 0.5 g was dissolved in t-butyl benzene in an amount of 3.0 mL. OH-TEMPO in an amount of 0.077 g and di-t-butyl peroxide in an amount of 0.033 g were added. The air was removed and nitrogen substituted. The mixture was stirred for 5 hours, while maintaining the temperature at 150° C. The reaction solution was poured into methanol, the polymer was precipitated, then this was reprecipitated by toluene-methanol and dried in vacuo at 60° C. $^1$H-NMR was used for analysis to confirm the introduction of the TEMPO portion. The introduction rate was 0.10 mol %.

Then, this OHT-IIR in an amount of 0.5 g was dissolved in t-butyl benzene in an amount of 3.0 mL, glycidyl methacrylate was added in an amount of 0.064 g, nitrogen was substituted, then the resultant mixture was stirred at 150° C. for 1 hour. The reaction solution was poured in methanol, the polymer was precipitated, then this was reprecipitated by toluene-methanol and dried in vacuo at 60° C. $^1$H-NMR was used for analysis to confirm the introduction of the glycidyl methacrylate-derived epoxy group. The introduction rate was 0.09 mol %.

TABLE I

|  | Starting rubber (A) | Reaction system | Polymerizable monomer (D) | Introduction rate (mol %) |
|---|---|---|---|---|
| Comp. Ex. 1 | IIR[1] | Non-solvent | GMA[3] | 0 |
| Comp. Ex. 2 | IIR | Non-solvent | Styrene | 0 |
| Comp. Ex. 3 | IIR | Solvent | GMA | 0.09 |
| Ex. 1 | OHT-IIR[2] | Non-solvent | GMA | 0.30 |
| Ex. 2 | OHT-IIR[2] | Non-solvent | Styrene | 0.31 |

[1]BUTYL301 made by Bayer
[2]Product synthesized by us (see Synthesis Example)
[3]Glycidyl methacrylate made by Kanto Chemical

INDUSTRIAL APPLICABILITY

As explained above, according to the present invention, it is possible to introduce a desired functional group into a polymer, without causing a decrease in molecular weight, without causing gelation and without causing the formation of a homopolymer in the system, and therefore, this is useful as a modification method for improving the bondability to an inorganic material, wettability with a filler, compatibility with a polymer having a high (low) polarity, etc., without detracting from the performance inherent to the polymer.

The invention claimed is:

1. A method for modifying a polymer comprising:
   (i) as a first step, reacting a polymer (A), a compound (B) having a nitroxide radical in the molecule thereof and a radical initiator (C), in a non-solvent system in a mixer, whereby the component (B) is grafted to the polymer (A) to thereby obtain the grafted polymer (A) grafted with the component (B) and then
   to thereby obtain the grafted polymer (A) grafted with the component (D)
   (ii) as a second step, reacting the resultant grafted polymer (A) with a radical polymerizable monomer (D) in a mixer to thereby further graft the monomer (D) to the polymer (A), whereby the resultant further grafted polymer (A) has an improved bondability to an inorganic material, an improved wettability with a filler or an improved compatibility with a polymer having a high or low polarity.

2. A method for modifying a polymer as claimed in claim 1, wherein the compound (B) having a nitroxide radical in the molecule thereof is a 2,2,6,6-tetramethyl-1-piperidinyloxy radical or the derivative thereof.

3. A method for modifying a polymer as claimed in claim 1, wherein said polymer (A) is a polymer having an iso-monoolefin unit as the constituent unit thereof.

4. A method for modifying a polymer as claimed in claim 1, wherein said radical polymerizable monomer (D) is an acryl-based monomer or aromatic vinyl-based monomer.

5. A method for modifying a polymer as claimed in claim 1, wherein a ratio of the addition amounts of said ingredients (B) and (D) is (B):(D)=1:0.005 to 100 (molar ratio).

6. A method for modifying a polymer as claimed in claim 1, wherein a ratio of the addition amounts of said ingredients (B) and (D) is (B):(D)=1:0.005 to 1 (molar ratio).

7. A modified polymer obtained by a modification method according to any one of claims 1 to 6.

8. A method for modifying a polymer as claimed in claim 1, wherein the compound (B) is selected from the group consisting of those having the formulae (I), (II), (III) and (IV):

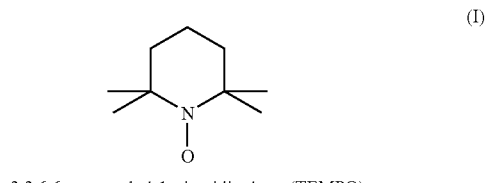

2,2,6,6-tetramethyl-1-piperidinyloxy (TEMPO)

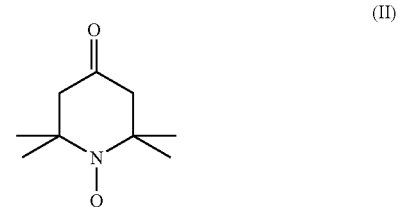

4-oxy TEMPO

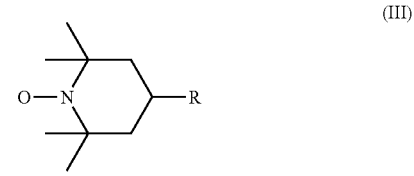

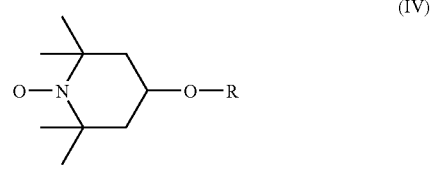

wherein R in the formulae (III) and (IV) indicate a $C_1$ to $C_{30}$ alkyl group, allyl group, amino group, isocyanate group, hydroxyl group, thiol group, vinyl group, epoxy group, thiurane group, carboxyl group, carbonyl-group-containing-group, amide group, ester group, imide group, nitrile group, thiocyan group, $C_1$ to $C_{20}$ alkoxy group, silyl group, alkoxysilyl group and, nitro group.

* * * * *